Aug. 21, 1973   H. G. SCHIRMER   3,754,063
METHOD FOR CASTING AN INFLATED TUBULAR POLYETHYLENE FILM
WITH MIXED POLYMER OF POLYPROPYLENE-POLYBUTENE-1
Filed March 23, 1970   4 Sheets-Sheet 1

INVENTOR
HENRY G. SCHIRMER
BY Edward J. Hanson Jr.
ATTORNEY

Aug. 21, 1973     H. G. SCHIRMER     3,754,063
METHOD FOR CASTING AN INFLATED TUBULAR POLYETHYLENE FILM
WITH MIXED POLYMER OF POLYPROPYLENE-POLYBUTENE-1
Filed March 23, 1970     4 Sheets-Sheet 3

United States Patent Office 3,754,063
Patented Aug. 21, 1973

3,754,063
METHOD FOR CASTING AN INFLATED TUBULAR POLYETHYLENE FILM WITH MIXED POLYMER OF POLYPROPYLENE-POLYBUTENE-1
Henry G. Schirmer, Spartanburg, S.C., assignor to
W. R. Grace & Co., Duncan, S.C.
Continuation-in-part of application Ser. No. 659,940, Aug. 11, 1967, which is a continuation-in-part of application Ser. No. 768,955, Sept. 23, 1968. This application Mar. 23, 1970, Ser. No. 21,793
The portion of the term of the patent subsequent to Sept. 21, 1988, has been disclaimed
Int. Cl. B29d 9/08
U.S. Cl. 264—22                    4 Claims

ABSTRACT OF THE DISCLOSURE

A laminated, tubular, thermoplastic film having excellent packaging and shipping abuse characteristics produced by continuously extruding a layer of an ethylene vinyl acetate copolymer onto a tubular substrate of a predominantly ethylene polymer material and continuously extruding an admixed isotactic polypropylene, polybutene-1 and atactic polypropylene polymer layer as the outer layer thereon and then orienting the resulting laminate. Prior to orienting, the laminate is heated in hot water.

---

This application is a continuation-in-part of my copending applications U.S. S.N. 659,940, filed Aug. 11, 1967 now Pat. No. 3,607,505 and U.S. S.N. 768,955, filed Sept. 23, 1968, both assigned to the same assignee as this application.

This invention relates to extrusion coated or laminated, oriented, heat-shrinkable films and the method for continuously producing them.

The use of heat-shrinkable thermoplastic films in many packaging applications is well established. Usually a product is enclosed in a film, sealed, and then heat is applied thus shrinking the film snugly about the product. One of the most useful and satisfactory thermoplastic materials for packaging film has proven to be polyethylene. A number of methods are available in the prior art to convert raw polyethylene into a suitable, heat-shrinkable packaging film. One method is taught by U.S. Pat. No. 2,855,517 issued to W. C. Rainer et al. on Oct. 7, 1958. Another method is taught by U.S. Pat. No. 3,022,543 issued to W. G. Baird, Jr. et al. on Feb. 27, 1962. In the Baird method, polyethylene is continuously extruded in the form of a tube, drawn, irradiated with electrons at a dosage between $2 \times 10^6$ and $20 \times 10^6$ rep, heated, and stretched again by applying internal pressure to the tubing. The resulting film usually has good heat-shrinking properties but relatively low tear strength. Once a tear has begun it tends to rapidly propagate during the heat shrinking process resulting in destruction of the film.

Therefore, it is an object of this invention to provide a heat shrinkable film with improved packaging and shipping abuse characteristics. This includes improved tear strength at room temperature as well as at shrinking temperature and greater bursting resistance when shrunk taut about a deformable product and subjected to pommelling.

Another object is to provide a film which will shrink at relatively low temperatures.

Another object is to provide a laminated, tubular film which can readily be made into pouches and bags.

Yet another object of the invention is to provide a heat shrinkable thermoplastic film having improved heat sealing properties.

Still another object is to provide a film having higher gloss and hardness.

A further object is to provide a film which is easier to handle, stack, and use when made into pouches and bags.

These and other objects are achieved by the present invention which provides a laminated thermoplastic film having an initially unoriented tubular thermoplastic substrate that is oriented subsequent to the lamination or coating. The substrate is laminated with an outer coating of a polymer of a mixture of 30–58% by weight of isotactic polypropylene, 22–50% by weight of polybutene-1, and 5–20% by weight of atactic polypropylene, cooled, reheated, and oriented. The resulting laminated film has considerably higher abuse characteristics than an oriented film alone; and, in addition, retains high shrink tension and free shrinking ability.

The novel method for producing the laminated film comprises the steps of providing cross-linked and un-oriented thermoplastic tubing, extruding a thermoplastic coating of a polymer of a mixture of 30–58% by weight of isotactic polypropylene, 22–50% by weight of polybutene-1, and 5–20% by weight of atactic polypropylene onto the tubing without stretching or orienting same, cooling the resulting laminated tubing, reheating the laminated tubing to the orientation temperature of the coating and then stretch-orienting the composite tubing.

The preferred substrate is a predominantly polyethylene material and the most preferred material is a polyethylene copolymer with 2–4% vinyl acetate. It is preferred that the substrate be irradiated prior to coating. Preferably the outer coating is secured to the substrate by a relatively thin coating or lamina of an adhesive polymer material that can be hot blown at the temperatures of orientation of both the outer coating or lamina and the inner substrate or lamina. The preferred adhesive lamina is a polyethylene copolymer with 8–13% vinyl acetate.

The invention may be better understood by reference to the following detailed description and drawings in which.

Figure 7:
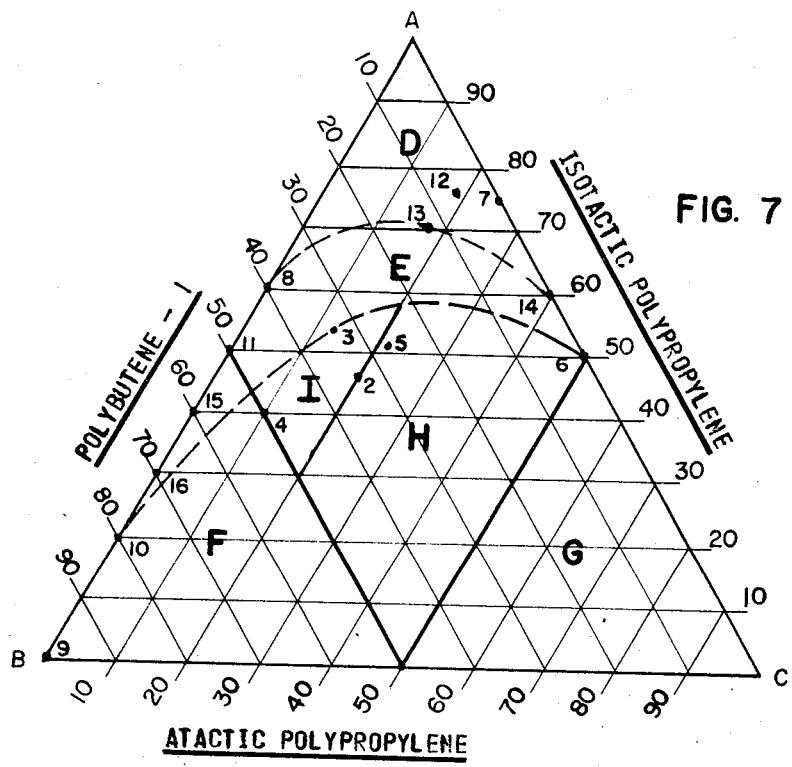
Figure 8A:
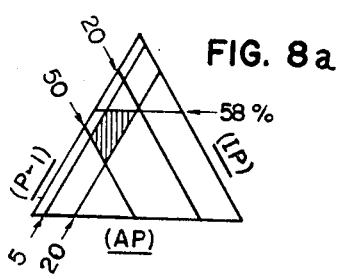
Figure 8B:
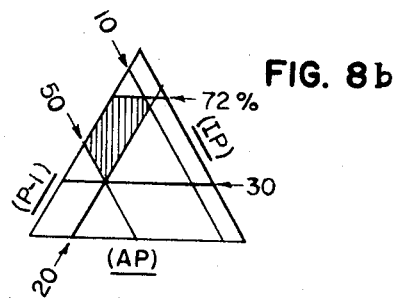
Figure 8C:
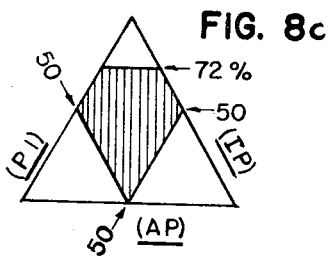

FIG. 7 is a graph showing a number of runs of said invention as set forth in Example II through XVI and the interpretation thereof based on the inventors knowledge of the art and observations of the example procedures; and, FIGS. 8a–8c are graphic showings of preferred embodiments of the outer coating as interpreted from the results of the examples and the graph of FIG. 7 and the inventor's projections thereof.

Figure 1:
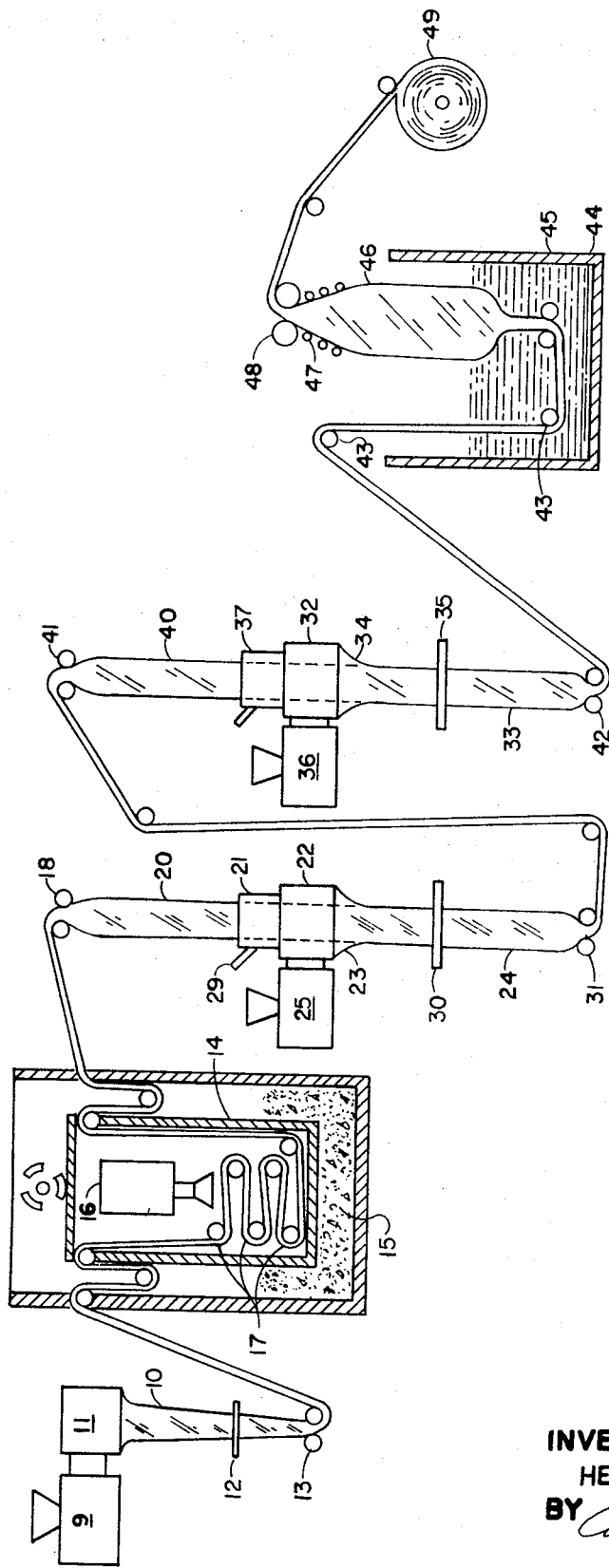
FIG. 1 is a schematic diagram of a preferred method for carrying out the invention.

Referring to FIG. 1, a conventional extruder 9 is shown into which is fed ethylene vinyl acetate copolymer having 3½% vinyl acetate by weight. The tubing 10 is extruded downwardly from die head 11 which is fed from extruder 9. After cooling by water spray from cooling ring 12 the tubing is collapsed by pinch rollers 13 and is fed through an irradiation vault 14 surrounded by shielding 15 where it is irradiated with electrons from an iron core transformer accelerator 16. Other accelerators such as a Vander Graff or resonating transformer may be used. The adiation is not limited to electrons from an accelerator since any ionizing radiation may be used. The unit of radiation employed herein is the rad which is defined as that amount of radiation which will dissipate 100 ergs of energy per gram of irradiated material by ionizing particles. The mr. is one million ($10^6$) rad.

The time of irradiation of the polyethylene tubing 10 is not critical but need only be enough to give the required dosage to effect cross-linking. In the present embodiment the radiation dosage should be in the range of about 2 to 8 mr., but preferably 4 to 6 mr. In the prior art it is usually desirable to irradiate to about 12 mr. At the lower dosages usable with the present invention the irradiation efficiency per pound of tubing is greatly increased and sealability is increased.

The tubing 10 is guided through the irradiation vault 14 by rollers 17; and, after irradiation, the tubing 10 goes through pinch rollers 18 following which it is slightly inflated by a trapped bubble 20 but not stretched longitudinally as the rollers 18 are driven at the same speed as rollers 13. The tubing is inflated only enough to provide a substantially circular tubing without significant transverse orientation. The slightly inflated tubing 10 passes through vacuum chamber 21 and through a laminating die 22 where the thermoplastic coating 23 is extruded onto the inflated tubing 10 thus forming laminate 24. The die 22 is fed molten thermoplastic from a conventional extruder 25. In the most preferred embodiment the coating is ethylene vinyl acetate copolymer having 9½% vinyl acetate by weight. Ethylene vinyl acetate copolymers having a vinyl acetate content in the range between 7% and 13% by weight are preferred thermoplastic coatings with those having a vinyl acetate content between 9½–10% being more preferred.

Figure 2:
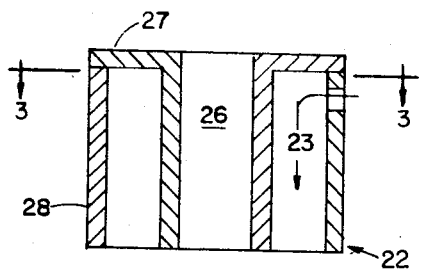
FIG. 2 is a cross-section of the die head used in the present invention.
Figure 3:
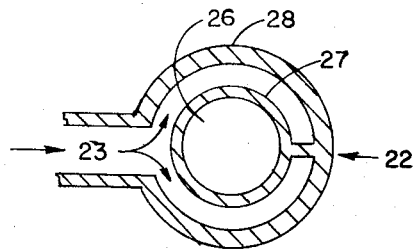
FIG. 3 is a view taken along line 3—3 of FIG. 2.

The extruder 25 is conventional, e.g., a standard 3½ inch extruder. The die 22 is an unconventional circular cross head die which is so machined as to provide a 3½ inch opening for the slightly inflated tubing 10. The details of the die 22 may be better appreciated by referring to FIGS. 2 and 3. The opening 26 through which the inflated substrate passes has been cut through mandrel 27 which is attached to the die housing 28. The path of the molten coating material 23 is indicated by the arrows in FIGS. 2 and 3.

The vacuum chamber 21 puts a mild vacuum, e.g., in the range from 0 to about 3 inches of water, on the die 22 to draw or "suck" in the extruded coating 23 while it is still molten against the inflated tubing 10 to prevent the formation of occluded bubbles in the laminate 24. The vacuum chamber 21 can simply consist of a cylindrical housing whose inner diameter closely conforms to the outer diameter of the inflated tubing. The vacuum can be applied through outlet 29 by a conventional vacuum hose.

The molten ethylene vinyl acetate copolymer coating 23 is extruded directly onto the predominantly polyethylene tubing with the temperature of the die 22 being typically about 420° F., and then cooled by the water spray from cooling ring 30. Pinch rollers 31 collapse the now formed laminate 24.

The process is repeated as the two-ply laminate 24 is inflated and passed through die 32 where it becomes three-ply laminate 33 as coating 34 is applied. Cooling ring 35, extruder 36 and vacuum chamber 37 serve the same function as before. The tube is also inflated slightly by a bubble 40 trapped between pinch rollers 41 and 42 in the same manner as the bubble 20 is trapped between pinch rollers 18 and 31.

The most preferred polymer mixture for this critical outer layer is illustrated in the graphs of FIGS. 7 and 8 in two graphic representations. The preferred and desired outer lamina for achieving the desired abuse characteristics as described in more detail under the heading Package Abuse Test in this application would be a mixed polymer material containing between 30–58% by weight of isotactic polypropylene, 22–50% by weight of polybutene-1 and 5–20% by weight of atactic polypropylene. For certain special applications mechanical mixtures containing 30–72% by weight of isotactic polypropylene, 10–50% by weight of polybutene-1 and 0–20% by weight of atactic polypropylene may be satisfactory and in other limited applications where abuse and quality standards are not very critical a mechanical mixture of the range of 0–72% by weight of isotactic polypropylene, 0–50% by weight of polybutene-1 and 0–50% by weight of atactic polypropylene may be suitable. Of course, additives such as stabilizers and the like may be included as is conventional in the practice of this art.

In the preferred embodiment the wall thickness of the substrate tubing prior to orienting would be 15 to 25 mils with the most preferred thickness being about 20 mils. The preferred thickness of the first coating is 1 to 3 mils with the most preferred thickness being about 2 mils. The preferred thickness of the second coating is 5 to 15 mils with the most preferred thickness being about 10 mils. The thickness of the most preferred laminate 33 prior to orienting would be about 32 mils. The laminate 33 as it passes through the pinch rollers 42 and over guide rollers 43 is thus substantially unstretched and unoriented.

A hot water bath tank 44 containing water 45 at about 212° F. raises the temperature of the laminate 33 to its orientation level. The laminate 33 is continually heated in hot water bath 45 to a temperature at or below the melting point of the substrate and the outer coating and then stretch oriented by the blown bubble technique. In the most preferred instance the temperature of the bath is maintained at about 212° F. Some variation is usually possible, however, and water temperatures of about 205° F. are operable in proper circumstances.

After the temperature of the inner and outer lamina tubing is adjusted to the proper orientation level and the temperature of the inner lamina is adjusted to above its orientation temperature the bubble 46 is blown and the film is stretched in both the transverse and longitudinal directions most preefrably in a ratio of about 3.6:1 longitudinally and 4:1 transversely, thus reducing the thickness of the laminate 33 to about 2.5 mils thickness. The coating and the substrate are reduced equally. Blow ratios of 3.4 to 4:1 in the longitudinal direction and 3.5 to 4.5:1 in the transverse direction are generally satisfactory and in certain instances blow ratios of 3.0 to 4.5:1 in the longitudinal direction and 3.0 to 4.5:1 in the transverse direction may be used. Biaxially stretching should preferably be about 14.5:1 and in certain instances may vary from 9:1 to 20:1. It is an important feature of this invention that the laminate be orientable out of hot water to produce a laminate with the desired physical characteristics, particularly shrinkability in hot water, at a reasonable cost. The bubble 46 is finally collapsed by rollers 47 and the laminate is conveyed through pinch rollers 48 and rolled onto windup roll 49.

When the ethylene vinyl acetate copolymer with about 9½% vinyl acetate is raised to a temperature of 212° F., it is slightly above its crystalline melting point. The crystalline melt point is approximately 209° F. For proper performance the melt point of the intermediate ply should preferably be below 212° F. in the usual circumstance. The blowing causes the melted ethylene vinyl acetate copolymer layer to flow and become hot blown and thus substantially unoriented while the irradiated or cross-linked polyethylene layer becomes highly oriented as does the outer layer of polymer. The resistance to tearing exhibited by the laminate is due in part to the fact that the copolymer was melted at the usual orientation conditions of the irradiated polyethylene and the outer lamina and became hot blown rather than oriented.

Figure 4:
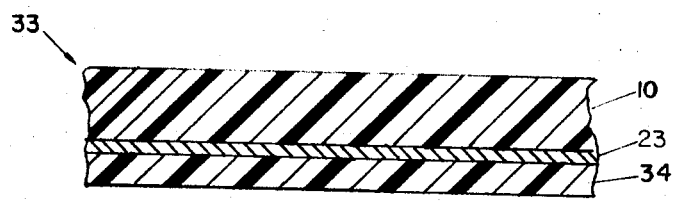
FIG. 4 is a cross-sectional view of the laminated film of the present invention.
Figure 5:
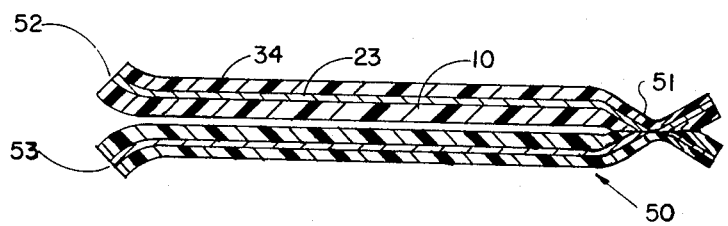
FIG. 5 is a cross-sectional view of an improved bag made from the laminated tubing showing the curl produced at the bag opening.
Figure 6:
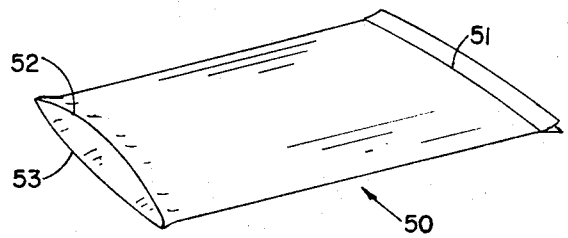
FIG. 6 is a schematic representation of the bag of FIG. 3.

In FIG. 4 a cross-section of the laminate 33 is illustrated showing substrate 10, coating 23 and coating 34. FIG. 5 shows a cross-section through a bag 50 which can be made from the laminated tubing 33. The tubing can be transversely cut and heat sealed resulting in a seal 51 which closes off one end of the tubular segment. The other end is left open to receive a product such as a turkey, beef round, etc. It is this open end to which attention is now drawn. The lips or edges 52 and 53 of the bag curl outwardly instead of lying flat as they would in the case of a non-laminated thermoplastic bag. Since the outer layer of the bag is apparently stressed more than the coating and substrate layers, there is an outward curl. The outward curl of the bag lips has the advantage of making the bags easier to open. On production lines where bags are opened manually and the product inserted therein even a short delay encountered in opening a bag is costly. Bags made from non-laminated film have lips which lie flat and tend to adhere to each other. The curled lip on the bags made from film according to the present invention enables a worker to more easily separate the bag lips and open the bag, thus increasing production. FIG. 6 further illustrates a bag or pouch made from the tubular laminate.

Heat seals, such as heat seal 51 in FIG. 5, are improved because of the lower irradiation dosage given the substrate which normally will serve as the sealing surface in a packaging application of the present invention.

It will also be understood that die 22 and die 32 may be aligned and the tubing may be passed sequentially through the respective dies without the necessity for intermediate cooling and collapsing of the tubing as shown at 30 and 31. A single two ply coating die could also be used. It would also be possible to carry out the procedure in entirely separated stages by winding the collapsed film up after each procedure. In this manner the procedures could be carried out at different locations or in a particular plant situation that did not allow for the proper juxta-positioning of the equipment for the continuous procedure shown in FIG. 1.

The invention is best illustrated by the following examples.

EXAMPLE I

Following the procedure as schemically outlined in FIG. 1, an ethylene vinyl acetate copolymer containing 3½ vinyl acetate (Du Pont Alathon 3445) is fed into the extruder hopper of extruder 9 which is a 3½ inch Hartig Extruder and is operated at the following temperatures, rear zone 325° F., mid-barrel 375° F., front barrel 400° F., adaptor 300° F. and die 360° F. The screw r.p.m is 13 and the pressure is 3,300 ps.i. The die diameter is 3.5 inches and the tubing circumference produced is 8 inch. The water from the cooling ring 12 is at 62° F., the pinch rolls 13 are operated at 14 feet per minute and the tubing thickness is approximately 20 mils.

The collapsed tubing is passed through an irradiation vault such as that depicted in FIG. 1 operated at 1,000 kvp. 20 ma. and a speed of 14.0 feet per minute, 4 passes are made and the tubing receives a dosage of 5.7 mr.

The irradiated substrate film is then passed to a coating die 22 where is is coated with an ethylene vinyl acetate copolymer containing 8½% vinyl acetate (Du Pont Alathon 4244). The resin is fed into the hopper of extruder 25 which is a 1¾ inch Prodex Extruder operated with a cross head die of the type illustrated in FIGS. 2 and 3. The second extruder is operated at the following temperatures: rear zone 325° F., mid-barel 375° F., front barrel 400° F., adaptor 300° F., and die 360° F. The screw r.p.m. is 13 and the pressure is 3,300 p.s.i. The die diameter is 3.5 inches and the tubing circumference is 8 inches. The top rolls 18 are operated at 14.0 feet per minute and the bottom rolls 31 at 14.5 feet per minute. The water from the cooling ring 30 is at 62° F. and the coating thickness is approximately 2 mils.

The second coating resin is a mixture of 53.3% by weight of isotactic polypropylene (Novamont[1] F007), 33.3% polybutene-1 (Mobil[1] PB 103) and 13.3% atactic polypropylene (Novamont[1] Lot 2030). The atactic and isotactic polypropylene are first added in proper proportion to a Banbury mixer and melt belnded for approximately 8 minutes at 400° F. and then extruded into a sheet which is diced into pellets. These pellets are combined with pellets of polybutene-1 in a rotating drum and this admixture is charged to the hopper of the second coating extruder which is depicted at 36. The extruder 36 is a 2½ inch N.R.M. Extruder and it is operated at the following temperatures: rear zone 385° F., mid-zone 400° F., forward zone 450° F., adaptor 400° F. and die 425° F. The screw r.p.m. is 32. The top rolls 41 are operated at 14.5 feet per minute and the bottom rolls 42 at 15.0 feet per minute. The water from the chilled ring 35 is at 62° F. and the coating thickness is approximately 10 mils.

Biaxial orientation is carried out by pre-heating in water 210° F. to 212° F. as shown at 44 of FIG. 1 and passing the thus heated tubing through pinch rolls operating at 15 feet per minute to deflate rolls operating at 56 feet per minute and blowing the 4 inch wide tubing to produce a film width of approximately 16 inches with a film thickness of approximately 2.5 mils. This tubing is then rolled up on a storage roll which is delivered to a converter who prepares the bags by sealing the bottoms of the bags in a conventional manner and obviously severing the tubing in the desired bag lengths.

EXAMPLES II–XVI

The above procedure was repeated except for the variation in the outer coatings composition as illustrated in the graph of FIG. 7 with plots 2–16. Of course, in Examples 6, 7 and 14 no polybutene-1 mixing procedure was carried out and in Examples 10, 16, 15, 11 and 8, no atactic polypropylene-isotactic polypropylene combining or mixing procedure was carried out, and in Example 9 no mixing procedure was carried out.

Package abuse tests

The following tests were run under commercial conditions using bags made from tubing made substantially as described in Example I. The tests were made in a commercial plant and involved the packaging of dressed turkeys having weights of approximately 20 to 22 pounds in bags made according to this invention that were 16.5 inches wide and 24 inches deep and regular commercial polyethylene bags sold under the L-film trademark of W. R. Grace & Co.'s Cryovac Division, the assignee of the present application, which were produced from tubing manufactured in a manner generally corresponding to that taught in Pat. 3,022,543 which was mentioned earlier in this application. These bags were 16.0–16.25 inches wide and 23 inches deep.

The birds were inserted into marked intermixed bags of the two types on the packaging line in conventional manner and the loaded bags were vacuumized on a lift nozzle and the bag necks twisted and clipped as is usual. The closed bags were passed through hot water shrink tunnels in conventional manner operated at between 205–208° F. and shrunk also in conventional manner. The tunnels were run at 36 feet per minute.

The following charts show the results noted through the tunnel.

---

[1] Novamont is a trademark of the Novamont Corp. and Mobil is a trademark of the Mobil Oil Co.

PACKAGING BREAKAGE PERFORMANCE

|  | Seals | Hock | Clip cut | Neck puncture | Elbow puncture | Wing tip | Air in bags [1] | Unknown [2] |
|---|---|---|---|---|---|---|---|---|
| New bags | 1 | 6 | 10 | 2 | 3 | 6 | 91 | 1 |
| Standard bags | 4 | 26 | 32 | 8 | 5 | 9 | 81 | 14 |

[1] Air in bags means bags came out of tunnel ballooned and reason could not be determined at production line speeds.
[2] Unknown means bags were torn to such an extent that origin of tear could not be determined.

Total loss on New Bags—120 out of 2,000=6%
Total loss on Standard Bags—179 out of 2,000=9%

After watching operation the second day, it was determined that air in the bags was caused in most cases by operator losing vacuum in the clipping process. If the rejects due to air in the bags are substracted from the total "breakage" the data would show New Bags 29/2000= 1.45%, Standard Bags 98/2000=4.90%.

Frozen package abuse performance

The following morning a check was made on the packout of the test birds from a standard liquid freezer which included considerable bumping of the frozen packages as they moved along chutes and conveyors. The total number could not be checked due to the pack-off procedure and the large number of birds moving down the pack-off conveyor simultaneously.

The following procedure was used: 100 New Bags and 100 Standard Bags were randomly checked. They could be identified by an A seal marker on the New Bags and an S seal marker on the Standard Bags. This was repeated five times.

|  | 1st 100 | 2d 100 | 3d 100 | 4th 100 | 5th 100 | Total | Percent breakage |
|---|---|---|---|---|---|---|---|
| New bags | 13 | 14 | 12 | 9 | 12 | 60 | 12 |
| Standard bags | [1] 26 | [2] 28 | 23 | [3] 21 | 22 | 120 | 24 |

[1] 6 rejects. [2] 8 rejects. [3] 5 rejects.

The number in the table is the number of bags per hundred that had holes in them. These punctures had occurred since being placed in the liquid freezer under normal packing house operating procedures.

The Quality Control used the following procedure: If there is a puncture in the bag (looking from the breast side), it is rejected or returned for rebagging; if the tear or puncture is on the back side, it is not rejected unless the puncture is longer than ½ inch.

There were 60 New Bags with punctures and no rejects in 500 random samples. There were 120 bag punctures in the Standard Bags with 19 rejects in a random sample of 500.

Conclusion: The New Bag has some definite advantages in the production line, but the most noted advantage is in the freezing and pack-out operation where breakage is only about ½ of Standard Bags.

Simulated shipping test

Twenty-four Grade A, 18 lb. 1 oz. to 19 lb. 15 oz., bagged and frozen tom turkeys were purchased from a chain grocery store.

New shipping cartons were used in the abuse tests in two sizes, large box 22½" x 16" x 9" and small box 21½" x 15" x 9". Two removable box bottoms, made of pressed wood, were made to exactly fit the bottoms of the respective boxes. Two pieces of pressed wood of the same size as the box bottom flap were glued to each of the pressed wood bottoms. These wooden bottoms were placed in the boxes during the test to simulate the actual box bottoms which would have the two bottom flaps exposed on the inside of the box. The edges of these flaps are a major cause of damage to packages shipped in such boxes. This technique helped to make sure that each time the tests were repeated on the shaker machine, the abrasive force of the box bottoms would be the same.

The frozen turkeys were rebagged, two per box, one in the new bag of this invention, which was 16" x 24" and had a gauge of 2.4 to 2.8 mils. The other was packaged in a Perflex [2] S 2.3 to 2.7 mils 16" x 24" polyethylene bags.

The bags on the frozen turkeys were shrunk in a hot water dip tank at 210° F., boxed in the test boxes with the false bottoms of pressed wood, and put on the shaker machine set at 250 r.p.m. Preliminary tests showed that a test time of 30 minutes on the shaker destroyed both the New Bags and the Perflex S bags. By guess, it was found that a test time of 10 minutes, later reduced to 8 minutes, would not destroy the bags on the turkeys.

Each turkey was examined for possible bag breakage on the two wing elbows, back, and hock for a possible total breakage of 4 breaks per bird. Data is recorded in the table. Then the turkeys were rebagged reversing alternately the new turkey bags and Perflex S bags on each bird with each turkey being used 3 or 4 times in the test. The turkeys were used in this test not more than twice in any one day in order to insure that they were solidly frozen while being tested. The birds were refrozen and stored overnight in the freezer.

Conclusion: Data presented in the table shows box size is less important than the kind of turkey bag as a cause of breakage. Turkeys in the new turkey bags were significantly more resistant to abuse generated in the shaker test than Perflex [2] S turkey bags. Of the potential breaks, 26.78% occurred in the new bags, or one in four; while in the Perflex [2] S bags, 47.02% or roughly two in four occurred. This difference is statistically significant at as high as 0.995. In other words, there is hardly any doubt that the lower mean failure rate of the new bags was not real.

[2] Trademark of Union Carbide.

COMPARATIVE ABUSE RESISTANCE OF NEW BAGS AND PERFLEX S BAGS ON FROZEN TURKEYS

| Bags used | Shipping cartons | Number of breaks per bird in bags on frozen turkeys [1] | Total breaks | Total packages | Percent potential breaks |
|---|---|---|---|---|---|
| New bags | Small box | 2 0 1 0 2 2 1 1 1 1 1 3 1 2 0 1 2 2 0 0 | 24 | 84 | 28.57 |
|  | Large box | 2 2 1 1 1 2 1 1 0 1 0 1 2 0 1 3 1 0 0 0 1 | 21 | 84 | 25.00 |
|  | Total | 4 2 2 1 3 4 2 2 1 2 1 2 5 1 3 3 2 2 2 0 1 | 45 | 168 | [2] 26.78 |
| Perflex S bags | Small box | 1 1 3 1 3 0 3 1 2 0 2 4 2 3 1 2 3 1 1 2 1 | 37 | 84 | 44.04 |
|  | Large box | 3 2 4 2 3 1 2 3 1 0 0 4 2 2 3 2 1 2 3 1 1 | 42 | 84 | 50.00 |
|  | Total | 4 3 7 3 6 1 5 4 3 0 2 8 4 5 4 4 4 3 4 3 2 | 79 | 168 | [2] 47.02 |

[1] Each turkey checked for resistance to abuse could be broken at the 2 elbows, back and hock for a total of four breaks per turkey.
[2] Average.

In the graph of FIG. 7:

D=Unprocessable region
E=Borderline processability
F=Area of poor gloss
G=Area of high tack and poor high temperature strength
H=Area of moderate tack and rapidly decreasing high temperature strength
I=Preferable area

I claim:

1. In a process for producing laminated, oriented film from thermoplastic materials by extruding a hot coating layer onto a pre-manufactured substrate layer, the improvement of producing the film in oriented, tubular form which comprises the steps of:
   (a) providing an inflated, but not stretched, tubular substrate of thermoplastic material of a polymer of ethylene material that can be oriented out of hot water;
   (b) providing a circular extrusion die;
   (c) passing said inflated substrate through said die; and consequently,
   (d) extrusion coating the outside of said substrate with a molten thermoplastic material comprised of a mixed polymer in the ratios by weight set forth selected from the group consisting of 30–72% isotatic polypropylene, 10–50% polybutene-1 and 0–50% atactic polypropylene onto the substrate thereby producing a laminate;
   (e) providing relatively lower pressure in the region between said substrate and said mixed polymer at the time of said coating than on the outside of said mixed polymer and thereby precluding entrapment of air therebetween;
   (f) chilling said mixed polymer immediately after said extrustion coating and within a period providing said mixed polymer with a character enabling its orientation out of hot water;
   (g) passing the laminate through pinch rollers;
   (h) submerging said laminate in hot water and heating said laminate to the orientation temperature of said quenched mixed polymer and the orientation temperature of said substrate; and
   (i) inflating said hot water heated laminate and stretching the laminate and orienting said substrate and said mixed polymer.

2. The method of claim 1 wherein the mixed polymer specified in step (d) is selected from the group consisting of 30–50% isotactic polypropylene, 22–50% polybutene-1 and 5–20% atactic polypropylene.

3. The method of claim 1 wherein an intermediate adhesive laminate of ethylene vinyl acetate copolymer is coated onto the substrate between said substrate and said coating and said heating of said three ply laminate at least substantially melts said copolymer and thus causes the copolymer's substantial unorienting stretching during inflation of said laminate.

4. The method of claim 3 wherein said substrate is extruded in tubular form and passed through an irradiation means and irradiated to a dosage between 2 and 16 MR and both coatings are applied in a continuous process.

References Cited
UNITED STATES PATENTS

| | | | |
|---|---|---|---|
| 3,508,944 | 4/1970 | Henderson | 264—173 X |
| 3,068,516 | 12/1962 | Hofer | 117—161 UF |
| 3,381,717 | 5/1968 | Tyrrel | 156—244 X |
| 3,547,754 | 12/1970 | Tokos | 117—161 UH |
| 3,485,907 | 12/1969 | Quackenbush | 264—173 |
| 3,486,196 | 12/1969 | Klenk | 264—173 X |
| 3,524,795 | 8/1970 | Peterson | 156—244 X |
| 3,018,263 | 1/1962 | Schneider | 260—33.6 AQ X |
| 3,347,962 | 10/1967 | Dieck | 264—102 X |
| 3,356,765 | 12/1967 | Musso | 156—244 X |
| 3,372,049 | 3/1968 | Schaffhausen | 264—289 X |
| 3,607,505 | 9/1971 | Schirmer | 264—176 R X |

FOREIGN PATENTS

| | | | |
|---|---|---|---|
| 298,844 | 8/1965 | Netherlands | 264—173 |
| 1,238,195 | 4/1967 | Germany | 264—173 |

DONALD J. ARNOLD, Primary Examiner

J. R. THURLOW, Assistant Examiner

U.S. Cl. X.R.

117—161 UH; 156—244, 277; 264—89, 102, 173, 210 R